Aug. 27, 1968   L. KLEIN   3,398,772
PROTECTIVE CANOPY FOR SLIDING TABLE SAW
Filed June 20, 1966   2 Sheets-Sheet 1
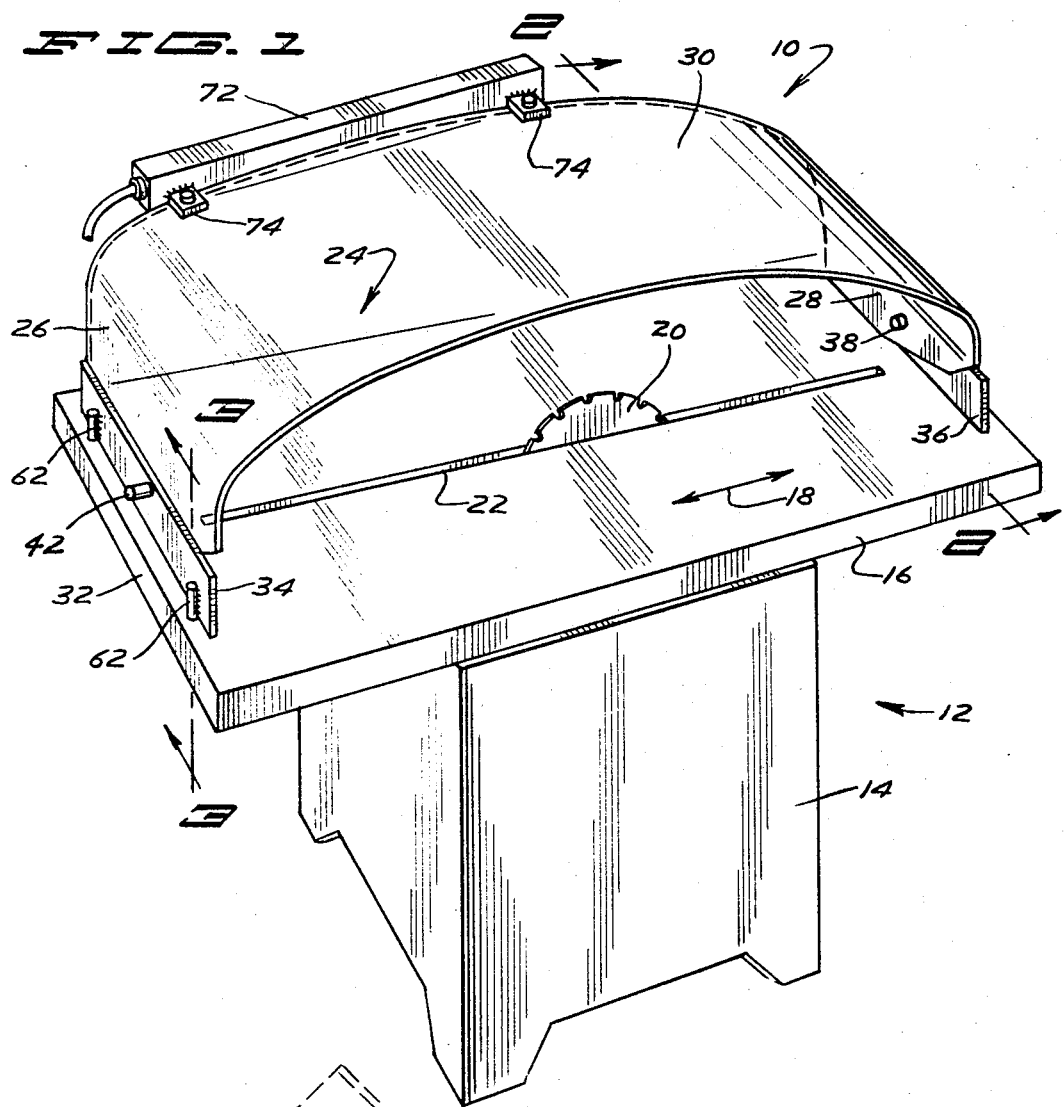
INVENTOR.
LOUIS KLEIN
BY Meyers & Peterson
ATTORNEYS Aug. 27, 1968
L. KLEIN
3,398,772
PROTECTIVE CANOPY FOR SLIDING TABLE SAW
Filed June 20, 1966
2 Sheets-Sheet 2
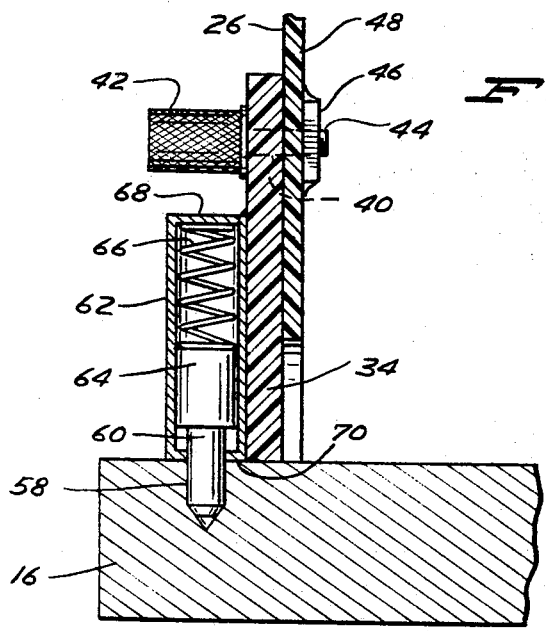
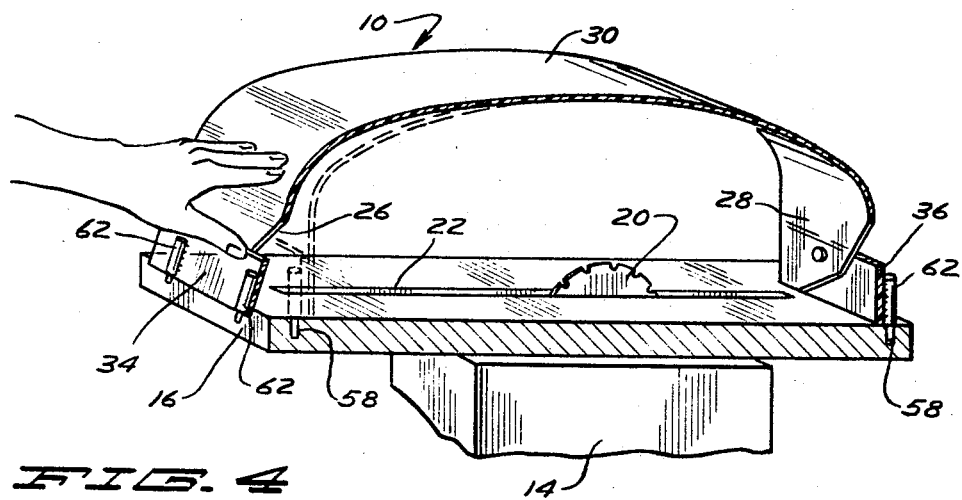
INVENTOR.
LOUIS KLEIN
BY Meyers & Peterson
ATTORNEYS United States Patent Office 3,398,772
Patented Aug. 27, 1968

3,398,772
PROTECTIVE CANOPY FOR SLIDING
TABLE SAW
Louis Klein, 569 Sheppard Ave. W., Apt. 1202,
Downsview, Ontario, Canada
Filed June 20, 1966, Ser. No. 558,732
6 Claims. (Cl. 143—159)

ABSTRACT OF THE DISCLOSURE

A protective canopy for a sliding table saw comprised of a resilient, transparent panel longitudinally bridging the saw slot in the table; the canopy being flexed for detachable mounting on the table and being pivotal about a longitudinal axis.

---

This invention relates to power saws of the sliding table type. More particularly, the invention relates to a shield or canpoy for use on such a saw to provide protection against particles or pieces thrown off or kicked back by the sawblade.

Power saws of the type to which the present invention is directed employ a work-supporting table which is slidably mounted on a suitable base member. The sawblade itself normally projects upwardly through an elongated slot in the sliding table, the slot being long enough to accommodate the full sliding motion of the table. The arrangement is such that a work piece may be placed on the table and held there, the table then being moved to bring the work piece into contact with the sawblade to effect the desired cut.

It is an object of the present invention to provide a protective canopy for use on such a saw to protect the operator and bystanders from flying sawdust or other particles thrown off above the surface of the table by the sawblade.

It is another object of the present invention to provide for a sliding table saw a protective canopy which affords complete protection regardless of the relative position of the table with respect to that of the sawblade.

Still another object of this invention is to provide a protective canopy, for use on a sliding table saw, to be interposed between the operator and the saw table and which will provide complete visibility for setting up work and for viewing the cutting operation while in process.

Yet another object of the invention is to provide a protective canopy which gives, in addition to protection and viewability, complete freedom from inconvenience, hindrance or restriction when positioning work on the table.

Still another object of the invention is to provide a protective canopy for a sliding table saw in which the sawblade is tiltable with respect to the plane of the work-supporting table, the shielding portions of the canopy being adapted to be tilted to follow the tilt of the sawblade so that complete protection is available regardless of the angle of the blade.

A further object of the invention is to provide a protective canopy which can be easily attached to and removed from the surface of the work-supporting table.

The aforementioned objects are achieved in the present invention by means of a canopy which extends completely over the sawblade travel with respect to the work-supporting table, the canopy including vertically oriented shielding portions adjacent the respective ends of the sawblade accommodating slot and a bridging portion disposed above the surface of the table and extending between the end portions. The two end portions are pivotally mounted on respective base elements which in turn carry means for attaching the canopy to the table. The connections pivotally mounting the end portions on their respective bases provide for rotation of the end and bridging portions about an axis parallel to the tilting axis of the sawblade.

The end portions and the bridging portion in the preferred embodiment to be described below are formed integrally from a single sheet or panel of transparent, resilient plastic material. For attaching the canopy to the table of the saw, the table is provided with a plurality of recesses located adjacent to the ends of the sawblade accommodating slot, the base members of the canopy being provided with pins which project into the recesses to hold the canopy in place. The canopy is so made that in the unflexed condition of the plastic panel the pins on the base members will be at a spacing which is different from the longtiudinal spacing of the recesses in the table thus necessitating that the plastic panel be flexed in order to align the pins with the recesses thereby to mount the canopy on the table. This feature provides for a simple and secure attachment of the canopy to the table, the inherent resiliency of the plastic panel providing the force necessary to hold the pins securely in the recesses in the table.

Other objects, advantages and new features of the present invention will become apparent from a reading of the following detailed description when read in conjunction with the accompanying drawings wherein:

FIGURE 1 is a perspective view of a sliding table saw having a canopy according to the present invention mounted thereon;

FIGURE 2 is a vertical sectional view taken on the line 2—2 of FIGURE 1 and illustrating the shielding portions of the canopy in solid lines in one position and in phantom outline in another position thereof;

FIGURE 3 is a detailed sectional view showing one of the mounting pins for attachment of the canopy to the table, and taken on the lines 3—3 of FIGURE 1; and FIGURE 4 is a perspective view, partly in section, showing the canopy in the unflexed condition of the plastic panel in solid lines and illustrating the manner in which the plastic panel must be flexed in order to bring the mounting pins into alignment with the recesses in the table for mounting the canopy.

Referring now to FIGURE 1, the protective canopy of the invention is generally indicated at 10 in its operative position on a saw 12 of the sliding table type. Saw 12 is generally illustrated as comprising a base 14 which slidingly supports, on suitable guides not shown, a movable work-supporting table 16, table 16 being mounted for reciprocation in the direction of the arrows 18. Base 14 also supports a sawblade 20 and conventional power means (not shown) for rotating the sawblade. Sawblade 20 normally projects upwardly through an elongated slot 22 provided in table 16, the elongation of the slot 22, of course, permitting the table 16 to be reciprocated with respect to the sawblade during the operation of the saw.

The canopy 10 is arranged on table 16 to provide protection against flying particles which may be thrown by the sawblade 20. In the preferred embodiment shown, the canopy 10 includes a shield panel 24 formed from a sheet of transparent, resilient plastic material. Panel 24 is configured as shown to provide a pair of end portions 26 and 28 which are adapted to be upwardly or vertically disposed with respect to the table 16 at positions adjacent to the respective ends of slot 22 to protect the operator from low-flying debris. Between the end portions 26 and 28, the panel 24 forms a bridging portion 30 which extends above the surface of the table 16 to provide protection against flying particles having higher trajectories.

The height of end portions 26 and 28 is such as to dispose bridging portion 30 high enough above table 16 to enable the operator to maneuver the work comfortably and also to accommodate the height of objects disposed on table 16, such as for example extensible hold-downs as disclosed in my U.S. Patent No. 3,298,157, issued Jan. 17, 1967, and entitled "Hold-Down Clamp Assembly." The width of the panel 24 is such that the operator may take his usual position adjacent the end 32 of the table 16 and may insert his hands under the canopy through the open sides defined by the panel 24 to adjust the position of the work for clamping in position by the hold-downs mentioned above for example. The canopy 10 is thus relatively narrow and in no way impedes the operator in accomplishing adjustment of the work.

A pair of base members 34 and 36 are provided for supporting the panel 24 in the desired position on the table. The end portions 26 and 28 are pivotally attached to the base members 34 and 36, respectively, for rotation about a common horizontal axis which is parallel to the axis about which the sawblade 20 tilts when it is adjusted laterally, so that panel 24 may be tilted to follow lateral adjustments of sawblade 20. Such pivoting of panel 24 is required because particles are thrown off the sawblade in directions in the general plane occupied by the sawblade. Hence, panel 24 must be accommodated to the angle which sawblade 20 makes with the table so that thrown off particles will strike the panel 24 near its centerline and will then lose their force and drop down to the surface of the table.

End portion 28 is pivotally attached to base member 36 by means of a pivot pin 38 which allows free pivoting motion between the base 36 and the end portion 28. The opposite end portion 26, however, is attached to the base member 34 by means of a connection which allows the panel 24 to be frictionally retained in its adjusted position. This construction is best illustrated in FIGURE 3 where it will be seen that there is a pivot shaft 40 which joins the base 34 and the end portion 26. Pivot shaft 40 is provided with a knurled handle 42, and at its right end 44, shaft 40 is in threaded engagement with a nut 46 which is secured to the rear side 48 of the end portion 26 by means of any suitable adhesive. This arrangement is employed for convenience in manufacture only, and it will be understood that the shaft 40 may be threadedly engaged directly with the end portion 26 if desired. It will be clear that the handle 42 may be rotated to loosen the frictional coupling between the end portion 26 and the base member 34 to permit an adjustment of the angle of the canopy and may be tightened to preserve this adjustment.

The edges of each of the end portions 26 and 28 are shaped as shown to permit the angular adjustment of the canopy. The arrangement is best illustrated in FIGURE 2 where it will be seen that the end portion 28 has a first edge 50 which is parallel to the general plane of the panel 24 so that when it is in contact with the top surface 52 of the table 16, as shown in the solid position in FIGURE 2, the bridging portion 30 will be generally parallel to surface 52. The opposite corner of the end portion 28 is cut off at an angle with respect to the edge 40 to provide another stop edge 54 and this edge 54 when in contact with the surface 52, as shown in phantom outline in FIGURE 2, will dispose bridging portion 30 generally at 45° to the surface 52, although it will be understood that other angles may be selected if desired. Between the surfaces 50 and 54, the end portion 28 is cut off as indicated by the surface 56. The location of the surface 56 is not critical as long as there is no part of the end portion 28 which projects from the pivot axis defined by the pivot pin 38 a distance greater than the normal distance of that axis from the surface 52 of the table 16. Any protrusion greater than that distance in the space between the surfaces 50 and 54 would prevent the free rotation of the panel between the limits provided by the surfaces 50 and 54, as will be readily understood.

For holding the canopy 10 in place, the table 16 is provided with a plurality of recesses 58, as seen in FIGURES 3 and 4, the recesses 58 being positioned at suitable locations adjacent to the respective ends of the slot 22 to define the positions of the end portions 26 and 28. Each of the recesses 58 is adapted to receive a mounting element or pin 60 constructed in accordance with FIGURE 3. The various mounting pins 60 are slidably disposed in tubular housings 62 which are fixedly attached to the base members 34 and 36 in any desired manner. As seen in FIGURE 3, the pin 60 has an enlarged head portion 64 which is slidably received within the tubular housing 62. A spring 66 reacts between the end wall 68 of the tubular housing 62 and the upper end of the enlarged portion 64 of the pin 60 to bias the pin outwardly with respect to the housing 62. The various springs 66 are relatively light, the total force provided thereby being less than the weight of the canopy, so that if the canopy were placed on a plane surface the pins 60 would be pressed upwardly within the housing 62 and the base members 34 and 36 would rest on the surface. An internal flange 70 on the tubular housing 62 prevents the pin 60 from passing out of the housing 62.

As stated above, the panel 24 is of resilient material. In forming the end portions 26 and 28, the panel 24 is bent so that in the unflexed condition thereof, the mounting pins 60 at the opposite ends of the canopy will lie at a greater longitudinal spacing than the mounting recesses 58 in the table 16. This construction is suggested in FIGURE 4 where the solid line showing represents the unflexed condition of the canopy. The arrangement is such that the user must flex the panel 24 in order to align the various pins 60 with the recesses 58 in the table 16, after which the pins will enter the recesses to hold the canopy in place as illustrated in the dotted line showing of FIGURE 4. The usual manner of attaching the canopy 10 to the table 16 is to engage the pins 60 with the recesses 58 in one end of the table and then to press the opposite end portion inwardly along the surface of the table until the pins 60 at that end snap into the recesses 58 under the action of the springs 66. It will be understood, of course, that the panel 24 may also be bent so that the spacing of the pins 60 in the unflexed condition of the panel 24 will be less than the spacing of recesses 58 so that outward rather than inward flexure of the panel is required to effect the connection.

The canopy 10 also provides a convenient support for an illuminating device to light the surface of the table 16. Thus, as suggested in FIGURE 1, a fluorescent light fixture 72 is shown as being attached to the edge of the panel 24 by means of suitable lugs 74. The housing for the fixture may also be formed integrally with the panel 24 by means of suitable molding techniques, if desired.

It should now be apparent that a protective canopy has been described which fulfills the objects of the invention set forth hereinabove. It is to be understood, of course, that within the scope of the appended claims, the invention may be practiced otherwise than herein specifically described.

I claim:

1. A protective canopy for a sliding table saw having a sawblade and a work-supporting table movable relative thereto with said sawblade normally projecting through an elongated slot in said table, said canopy comprising a pair of upwardly directed end portions adapted to be disposed at locations adjacent to the respective ends of said slot and a bridging portion disposed above said table and extending between said end portions, said end portions and said bridging portion including a part at least of a resilient material;

co-operable disengageably-engageable mounting means on said end portions and said table respectively; said mounting means on said end portions, in the unflexed condition of said resilient part, being spaced by a distance different from the spacing of said mounting means on said table whereby said resilient part must be flexed to align said mounting means on said end portions and on said table and said resilient part will be under strain when said mounting means on said end portions and on said table are engaged with one another.

2. A protective canopy as defined in claim 1, particularly adapted for use on a sliding table saw in which the sawblade may be tilted laterally with respect to the table, said canopy further comprising a pair of supporting bases adapted to rest on said table, and means pivotally connecting said end portions to said supporting bases respectively for rotation about a common axis parallel to the axis of tilt of said sawblade, whereby said end and bridging portions may be tilted to maintain their normal relation to the plane of said sawblade.

3. A protective canopy as defined in claim 2, wherein the pivotal attaching means between one of said end portions and its supporting base includes means for selectively securing said one end portion against rotation with respect to said supporting base, at least one of said end portions having a first edge adapted to engage the surface of said table to define one pivotal position of said canopy and a second edge disposed at an angle with respect to said first edge, adapted to engage the surface of said table for defining another pivotal position of said canopy.

4. A protective canopy as defined in claim 1 wherein said end and bridging portions are integrally formed from a panel of resilient material.

5. A protective canopy as defined in claim 1 wherein said mounting means on said table comprises a mounting recess adjacent each end of the saw slot, and said mounting means on each said end portion comprises a mounting element adapted to be received in one of said mounting recesses.

6. A protective canopy as defined in claim 5, wherein each of said mounting elements comprises a plunger mounted for generally vertical movement with respect to said end portion and a light spring for biasing said plunger downwardly with respect to said end portion, the weight of said canopy being sufficient to overcome the force of said springs to allow retraction of said plungers when said canopy is placed on a non-recessed surface.

References Cited
UNITED STATES PATENTS

| | | | |
|---|---|---|---|
| 2,441,378 | 5/1948 | Zielinski | 143—159.7 |
| 2,655,067 | 10/1953 | Belcher | 82—34 |
| 3,204,499 | 9/1965 | Schoenrock | 82—34 |

FRANCIS S. HUSAR, *Primary Examiner.*

W. D. BRAY, *Assistant Examiner.*